United States Patent
Sung et al.

(10) Patent No.: US 10,218,467 B2
(45) Date of Patent: Feb. 26, 2019

(54) METHODS AND SYSTEMS FOR MANAGING ERROR CORRECTION MODE

(71) Applicant: Pismo Labs Technology Limited, Hong Kong (HK)

(72) Inventors: Patrick HoWai Sung, Hong Kong (HK); Kam Chiu Ng, Hong Kong (HK); Ho Ming Chan, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 3 days.

(21) Appl. No.: 15/295,550

(22) Filed: Oct. 17, 2016

(65) Prior Publication Data
US 2018/0109357 A1 Apr. 19, 2018

Related U.S. Application Data

(63) Continuation of application No. 14/582,642, filed on Dec. 24, 2014, now Pat. No. 9,473,274, which is a
(Continued)

(51) Int. Cl.
| | |
|---|---|
| *H04L 1/08* | (2006.01) |
| *H04L 12/24* | (2006.01) |
| *H04L 1/18* | (2006.01) |
| *H04L 1/00* | (2006.01) |
| *H04L 12/801* | (2013.01) |
| *H04L 12/26* | (2006.01) |

(52) U.S. Cl.
CPC .............. *H04L 1/08* (2013.01); *H04L 1/0041* (2013.01); *H04L 1/1896* (2013.01); *H04L 41/0654* (2013.01); *H04L 43/0829* (2013.01); *H04L 47/34* (2013.01)

(58) Field of Classification Search
CPC .......................... H04L 1/1812; H04L 1/1825
See application file for complete search history.

(56) References Cited

U.S. PATENT DOCUMENTS 5,034,826 A * 7/1991 Bergen ..................... H04N 5/93
386/271
6,205,569 B1 * 3/2001 Forehand ............... G11B 19/04
711/112
(Continued)

*Primary Examiner* — Joseph D Torres
(74) *Attorney, Agent, or Firm* — Hershkovitz & Associates, PLLC; Abe Hershkovitz

(57) ABSTRACT

The present invention discloses methods and systems for managing an error correction mode at a first communications router. The first communication router transmits data packets to a second communications router and stores the first data packet in a local storage medium, When a delay inquiry message is received from the second communications router, the first communications router activates the error correction mode. When the error correction mode is activated, the first data packet is retransmitted to the second communications router and an error correction packet corresponding to the first data packet is also transmitted. When a back-to-normal message is received from the second communications router, the first communications router deactivates the error correction mode. The back-to-normal message indicates that the first communications router no longer needs to be in error correction mode.

20 Claims, 15 Drawing Sheets

Related U.S. Application Data continuation-in-part of application No. 12/646,774, filed on Dec. 23, 2009, now Pat. No. 9,019,827.

(56)  References Cited

U.S. PATENT DOCUMENTS

| | | | |
|---|---|---|---|
| 2002/0013924 A1* | 1/2002 | Yamamoto | G06F 11/1008 714/763 |
| 2003/0011379 A1* | 1/2003 | Khoury | G11C 29/02 324/529 |
| 2007/0255981 A1* | 11/2007 | Eto | G06F 11/1008 714/710 |
| 2012/0324314 A1* | 12/2012 | Seshadri | G06F 11/1048 714/773 |
| 2013/0243442 A1* | 9/2013 | Noheji | H04B 10/25133 398/192 |
| 2014/0258813 A1* | 9/2014 | Lusted | H04L 1/004 714/776 |
| 2015/0113351 A1* | 4/2015 | Sung | H04L 1/1825 714/748 |
| 2017/0012738 A1* | 1/2017 | Mantiply | H04L 1/08 |

* cited by examiner

| Type | Data 1 | Data 2 |
|---|---|---|
| BWOPT_VERSION (0x01) | Version of this packet. Currently it is 1. | Nil |
| BWOPT_MAX_WAN (0x02) | Maximum number of WAN connections on the sender | Nil |
| BWOPT_WAN_MAXBW (0x03) | Number of 32 bit words in the Data filed | WAN connection's maximum downlink bandwidth in kbyte per sec. 32-bit word for each WAN. |
| BWOPT_DROP_RATE (0x04) | Number of 32-bit words in the Data field. This must be 2. | First 32-bit word is the number of packet dropped. Second 32-bit word is the total packet received. |

Fig.4B

METHODS AND SYSTEMS FOR MANAGING ERROR CORRECTION MODE

RELATED APPLICATIONS

The present application is a non-provisional continuation application which claims the benefits of and is based on application Ser. No. 14/582,642 titled "METHODS AND SYSTEMS FOR TRANSMITTING DATA THROUGH AN AGGREGATED CONNECTION" filed on 24 Dec. 2014. The contents of the above-referenced application are herein incorporated by reference.

TECHNICAL FIELD

The present invention relates in general to the field of computer networks. More particularly, the present invention discloses methods and systems for transmitting data packets frown a first communications router to a second communications router through an aggregated connection comprising a plurality of tunnels.

BACKGROUND ART

A multi Wide Area Network (WAN) Site-to-Site VPN router is a router that supports aggregating the bandwidth of multiple interconnections, e.g., WAN connections for accessing one or more remote private networks. In some implementations each TCP/IP session is routed to only one WAN. In this configuration, a single TCP file transfer session can only utilize the bandwidth of one WAN connection on each end. For example, in a session based site-to-site virtual private network (VPN) connection. VPN traffic is routed to multiple WAN connections between two sites (e.g., sites A and B).

In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

In wireless communications, quality of packet transmission may be unpredictable, and packet drop rate may change frequently. This may reduce the quality of the overall packet transmission. Even if the bandwidth limit of each tunnel is high, the packet drop rate may not improve. A solution is required for utilizing multiple tunnels for increasing the probability of successfully transmitting data, which may be achieved by transmitting data packets more than once and also by transmitting packets that can be used for retrieving the original data packets.

DISCLOSURE OF THE INVENTION

Summary of Invention

The present invention discloses methods and systems for managing an error correction mode at a first communications router. The first communication router transmits data packets to a second communications router. The first data packet may be received at the first communication router from a first host through a local area network (LAN) interface. The first data packet is destined to a second host, wherein the second host is reachable through lie second communications router. The first communications router stores the first data packet in a local storage medium. When a delay inquiry message is received from the second communications router, the first communications router activates the error correction mode. The delay inquiry message comprises a global sequence number of the first data packet and indicates that the first data packet has not been received by the second communications router successfully. When the error correction mode is activated, the first data packet is retransmitted to the second communications router and an error correction packet corresponding to the first data packet is also transmitted. When a back-to-normal message is received from the second communications router, the first communications router deactivates the error correction mode. The back-to-normal message indicates that the first communications router no longer needs to be in error-correction mode.

According to one of the embodiments, the error correction is a combination of a plurality of packets, including the first data packet. The error correction packet may also be a forward error correction (FEC) packet, automatic repeat request (ARQ) packet, or a parity packet. According to one of the embodiments, the delay inquiry message is an internet protocol (IP) packet, wherein the IP packet comprises a header, an other information field, and a payload. The global sequence number of the first data packet is in the payload and the other information field comprises information that the IP packet is a delay inquiry message, and session information of the first data packet. When a plurality of data packets have not been received by the second communications router, the delay inquiry message comprises global sequence numbers of the plurality of data packets.

According to one of the embodiments, the first data packet is transmitted through an aggregated connection established between the first communications router and the second communications router; wherein the aggregated connection comprises a plurality of end-to-end connections. The plurality of end-to-end connections comprises a first, second and third end-to-end connection. The first data packet is transmitted through the first end-to-end connection, the first data packet is retransmitted through the second end-to-end connection, and the error correction packet is transmitted through the third end-to-end connection.

According to one of the embodiments, the local non-transitory storage medium is a cache memory. The cache memory is capable of storing at least twenty seconds of data transmission.

BRIEF DESCRIPTION OF THE DRAWINGS

FIG. 4B is a chart that illustrates possible values for the fields of the feedback packet of FIG. 4A;

DETAILED DESCRIPTION

Figure 1A:
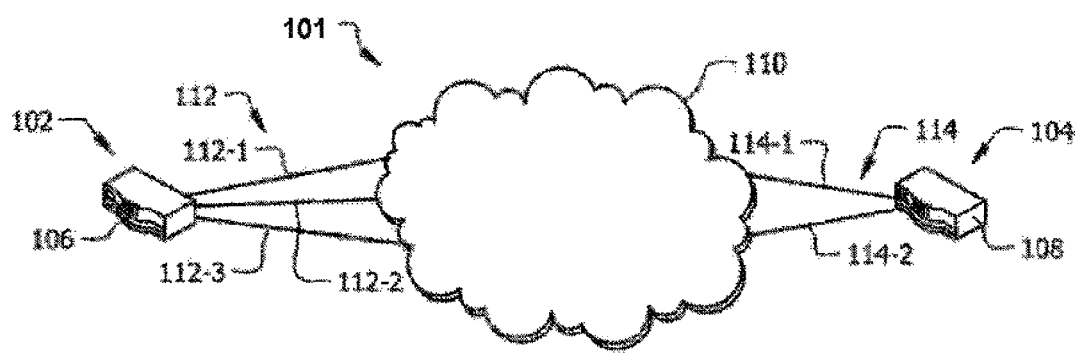
FIG. 1A illustrates an overall system for optimizing throughput of multiple variable bandwidth connections in accordance with an embodiment of the present invention.

The ensuing description provides preferred exemplary embodiments(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing nun for performing functions and operations as described herein. The program instructions making up the various embodiments may be stored in a non-transitory storage medium.

The program instructions making up the various embodiments may be stored in a storage medium. Moreover, as disclosed herein, the term "non-transitory storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated dining radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General, packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced. Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

FIG. 1A illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one network node. A network node may be referred to as a communications router. However the scope of the invention is not limited to communications routers, such that the invention can be carried out at gateways, routers, servers, or any other types of network nodes. For simplicity, FIG. 1A illustrates that sites 102 and 104 comprise communications router 106 and 108 respectively. Communication routers 106 and 108 may be embodied as multi WAN routers which support aggregating the bandwidth of multiple Internet connections. Communications routers 106 and 108 are connected over network 110. Network 110 may comprise a LAN, MAN, WAN, wireless network, the PSTN, the Internet, an intranet, an extranet, etc.

Site 102 and router 106 may comprise M connections 112, and site 104 and router 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, T1, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network.

Figure 1B:
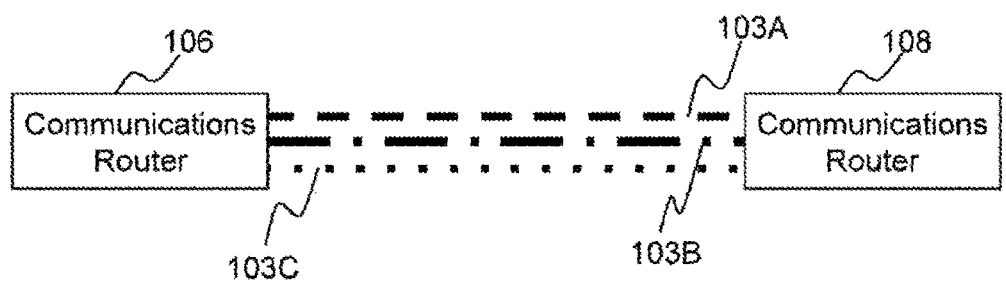
FIG. 1B illustrates a network environment according to various embodiments of the present invention.

FIG. 1B illustrates a network environment according to one of the embodiments of the present invention. Tunnels 103A, 103B and 103C are established between communications router 106 and communications router 108. Tunnels 103A, 103B and 103C may be bonded to form an aggregated connection.

Communications routers 106 and 108 may have a plurality of network interfaces according to one of the embodiments. Communications router 106 establishes tunnels 103A, 103B, and 103C via one or more of its plurality of network interfaces with one or more network interfaces of communications router 108.

Communication device 106 and 108 may work as a gateway, a router, a switch, an access point, a hub, a bridge, etc.

Figure 1C:
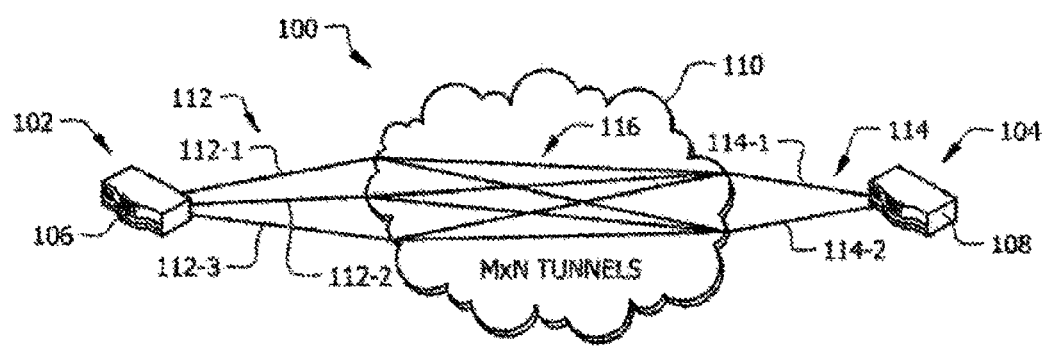
FIG. 1C illustrates system 100 adapted according to embodiments configured to optimize the throughput of bonded multiple variable bandwidth connections.

FIG. 1C illustrates system 100 adapted according to embodiments configured to optimize the throughput of bonded multiple variable bandwidth connections. System 100 is similar to system 101, with the exception of M×N virtual tunnels 116. When establishing a bonded connection between sites 102 and 104, such as by implementing a bonded site-to-site VPN connection, M×N tunnels 116 may be created. Tunnels 116 correspond to a unique permutation of the network connections of site 102 and the network connections of site 104. An aggregated connection may be formed between communications routers 106 and 108. Tunnels 116 may be virtual tunnels.

A plurality of established tunnels 116 may be aggregated, combined or bonded together to form one aggregated connection. Those skilled in the arts would appreciate that there are myriad ways to aggregate, combine, or bond a plurality of established tunnels to forum one aggregate tunnel. An aggregated connection is perceived as one tunnel by sessions or applications that are using it. An aggregated connection may be an end-to-end connection, a virtual private network connection or connectionless oriented connection. For example, an aggregated connection may be a TCP connection or UDP connection. In another example, aggregated connection is an aggregation of a plurality of tunnels, and each tunnel is linked between communications router 106 and communications router 108. In another example, an aggregated connection may be a VPN tunnel, comprising a plurality of established tunnels, and each established tunnel is linked between communications router 106 and communications router 108.

Figure 2A:
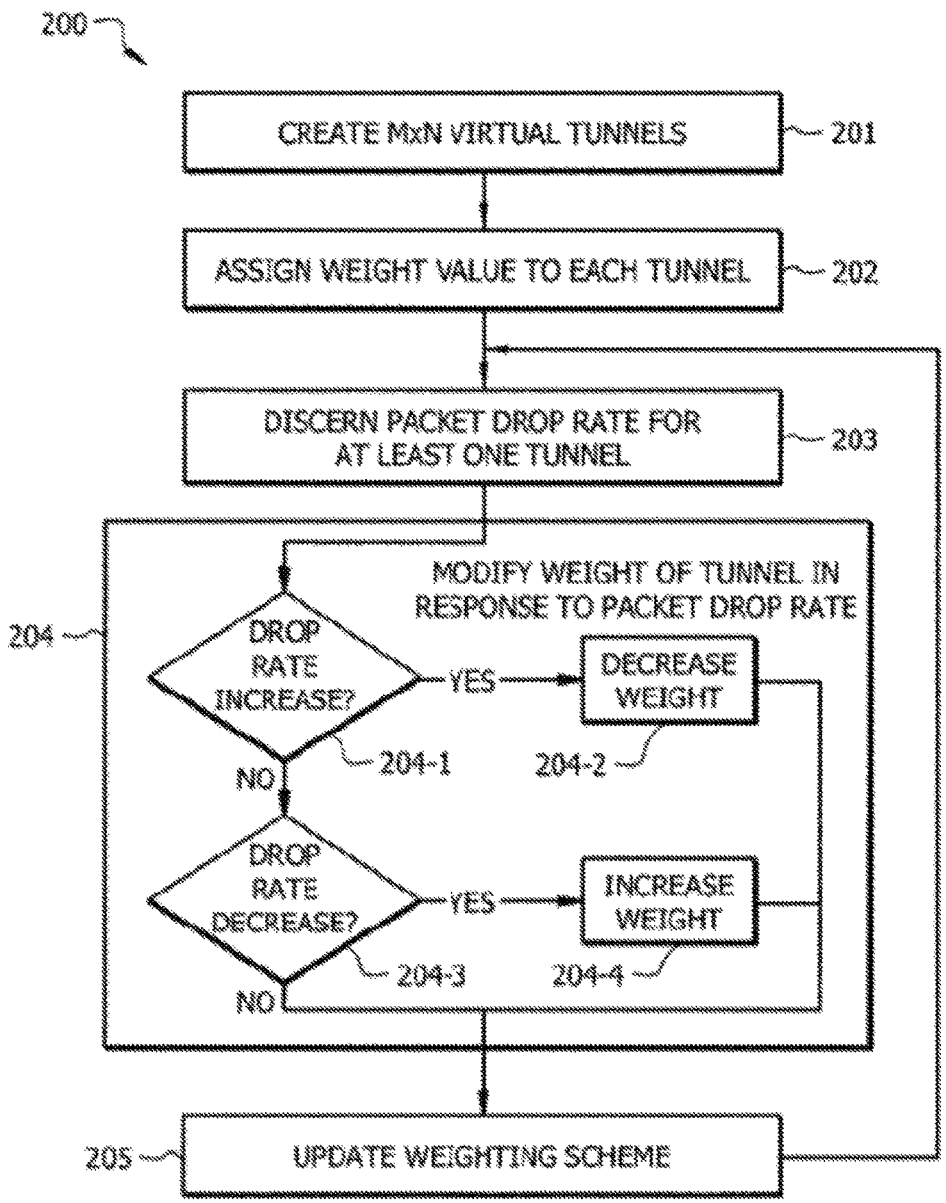
FIG. 2A illustrates a flowchart depicting a method for increasing throughput of a bonded connection in accordance with an embodiment of the present invention.

FIG. 2A shows a high level flow diagram of operation of system 100 depicting a method 200 for increasing throughput of a bonded connection. It should be appreciated that the particular functionality, the order of the functionality, etc. provided in FIG. 2 is intended to be exemplary of operation in accordance with the concepts of the present invention. Accordingly, the concepts herein may be implemented in various ways differing from that of the illustrated embodiment.

At block 201 of the illustrated embodiment when establishing a bonded connection between routers 102 and 104, such as by implementing a bonded site-to-site VPN connection, M×N virtual tunnels 116 may be created, as illustrated in FIG. 1C. Virtual tunnels 116 correspond to a unique permutation of the network connections of site 102 and the network connections of site 104.

At block 202 of the illustrated embodiment, default weights for the tunnels are determined and/or assigned. To determine default weights embodiments exchange uplink and downlink bandwidth data of connections 112 and 114 between sites 102 and 104. Using this bandwidth data, a default weight may be calculated according to the following: suppose site 102's downlink bandwidths of connections 1 to m are d1 d2, . . . dm, and site 104's uplink bandwidths of connections 1 to n are ur, U2, . . . Un; the default weight for the tunnel between site 102's connection X and site 104's connection V may be defined as DW(x,y), where DW(x,y)=dx,dy. Using the above method to calculate default weight, if connections 112-1 through 112 3 are WAN connections of a multi WAN router with respective uplink/downlink bandwidths of 10M/6M, 8M/4M, and 6M /6M, and connections 114-1 through 114-2 are WAN connections of a multi WAN router with respective uplink dot bandwidths of 7M/5M and 9M/3M, the respective default weights for each tunnel will be as follows:

TABLE 0001

| For site 102 | For site 104 |
| --- | --- |
| DW(1, 1) = 6 * 7 = 42 | DW(1, 1) = 5 * 10 = 50 |
| DW(1, 2) = 6 * 9 = 54 | DW(1, 2) = 5 * 8 = 40 |
| DW(2, 1) = 4 * 7 = 28 | DW(1, 3) = 5 * 6 = 30 |
| DW(2, 2) = 4 * 9 = 36 | DW(2, 1) = 3 * 10 = 30 |
| DW(3, 1) = 6 * 7 = 42 | DW(2, 2) = 3 * 8 = 24 |
| DW(3, 2) = 6 * 9 = 54 | DW(2, 3) = 3 * 6 = 18 |

It is noted that other ways to calculate default weight are contemplated, and the above is simply an example of the implementation of an embodiment of the present invention. It is noted that many different weighting schema may be used to define the initial bandwidth of a tunnel. For example, one may desire to only weight a tunnel in one direction using the downlink capacity of a receiving site and the uplink capacity of the sending site. Any weighting scheme used to characterize capacity of the tunnels at the establishment of the bonded connection may be used for the purposes of the present invention.

When packets are being routed from site 102 to site 104 according to embodiments, the packets will be distributed to the tunnels in a ratio according to an effective weight EW(x,y). Initially the effective weight of embodiments is set to be equal to the default weight, EW(x,y)=DW(x,y), and if the bandwidth of tunnels 116 remains unchanged from the initial setting, the effective weight is optimal for packet distribution. However, if a user is downloading a file over a bonded network connection in a TCP session with one or more tunnels having packet drops, the overall throughput of the session will drop dramatically. This is in part because the packet drops will keep causing TCP retransmissions and TCP's flow control will maintain a lower throughput even though tunnels without packet drops are not fully occupied.

One effective was to increase throughput would be to avoid such packet drops. To do so, embodiments of the present invention discern when tunnels are experiencing an increase or decrease in packet drop rates at block 203 of the illustrated embodiment. Embodiments further function to modify the effective weight of tunnels which are experiencing or have experienced changes in packet drop rates at block 204. The packet drop rate information may be monitored continuously or be monitored based on specific time periods. Once it is determined that a tunnel is experiencing an unacceptable rate of packet drops (block 204-1), the illustrated embodiment decreases the effective weight of the tunnel at block 204-2. In some embodiments, unacceptable may mean that the packet drop rate is a non-zero quantity, while other embodiments may determine that an unacceptable rate is any rate beyond a predefined threshold. Embodiments implement these decreases in stepwise fashion, in a continuous manner, in a reduction at one time in proportion to the increase in the packet drop rate, etc. When reductions are done in a gradual manner, embodiments, may continue to monitor the tunnel in order to optimize the amount of reduction which is implemented.

Tunnels 116 may be established or monitored by sending heartbeat packets through each tunnel from either router 106 or router 108. In some embodiments when the receive end fails to receive heartbeat packets from a tunnel for a period of time, it will treat that tunnel as down and the tunnel will not be used for routing traffic. If heartbeat packets again start being received, the tunnel may be re-established and be, weighted along with the other tunnels. As such, in the event that all packets are being dropped in a tunnel and the effective weight of that tunnel is reduced to zero, embodiments may utilize heartbeat packets to monitor and reestablish a connection.

Moreover, when tunnels recover all or part of their respective bandwidths, e.g. it is determined that the packet drop rate decreases (block 204-3), the illustrated embodiment functions to increase the effective weight of such tunnels (block 204-4) in order to fully, or more fully, utilize the bandwidth. Some embodiments increase the effective weight for a tunnel using predetermined step sizes until an accurate effective weight is regained. Other embodiments increase the effective weight proportionate to a newly measured bandwidth which may correspond to a newly measured packet drop rate. Moreover, embodiments may increase the effective weight for a tunnel based on a predetermined linear or exponential scale.

After the effective weight of the tunnels are adjusted, or it is determined that no adjustment is needed, the weighting scheme of the system is updated at block 205 of the illustrated embodiment. This update may comprise storing any processed, information, using such information in further processing, causing the system to take no action, etc. For example, processing performed with respect to block 205 may operate to average weighting schemes over a period of time, such as to mitigate error associated with highly transient anomalies. Further, the updated, information may be used on system 100 to modify the packet distribution of the data transfer session, as discussed with respect to FIG. 2B, System 100 may continue to implement steps 203-205 continuously or periodically throughout a data transfer session.

Figure 2B:
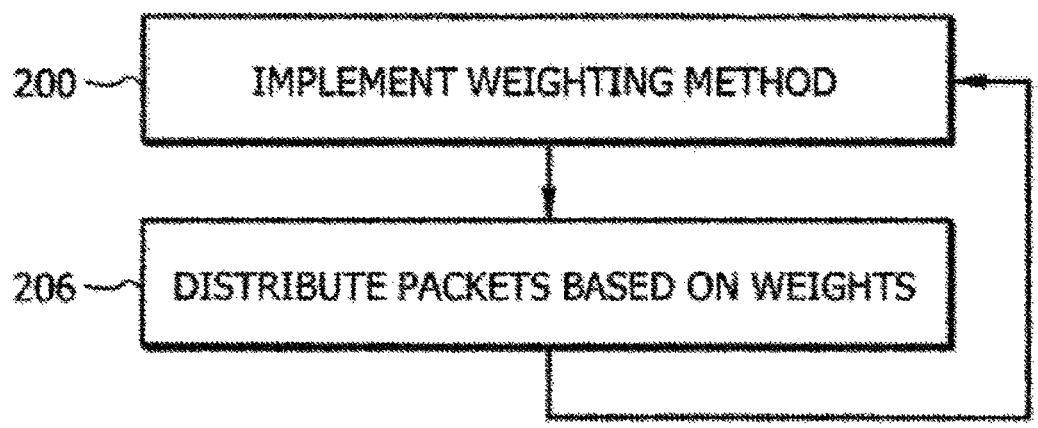
FIG. 2B illustrates a flowchart depicting a method for increasing throughput of a bonded connection in accordance with an embodiment of the present invention.

FIG. 2B illustrates an embodiment where, after weighting method 200 is implemented, the packets are distributed based, at least in part, on the modified weight of the tunnels. Specifically, block 206 of the illustrated embodiment operates to distribute packets across the tunnels in accordance with the weighting scheme determined by operation of method 200. In some embodiments, this distribution will change throughout a data transfer session, and therefore the steps of FIG. 2B are shown as repeating. Some embodiments change the packet distribution each time the system is updated at block 205. Moreover, block 205 may cause changes to be implemented periodically, in response to certain drop rate change thresholds, etc. It should be appreciated that the determination of weighting, by operation of method 200 and the application of determined weighting to packet distribution at block 206 may have different periodicity. For example, method 200 may operate to provide updates of weighting scheme information using a relatively short iterative cycle while the distribution of packets is altered based upon such weighting scheme information using a longer iterative cycle.

Figure 3:
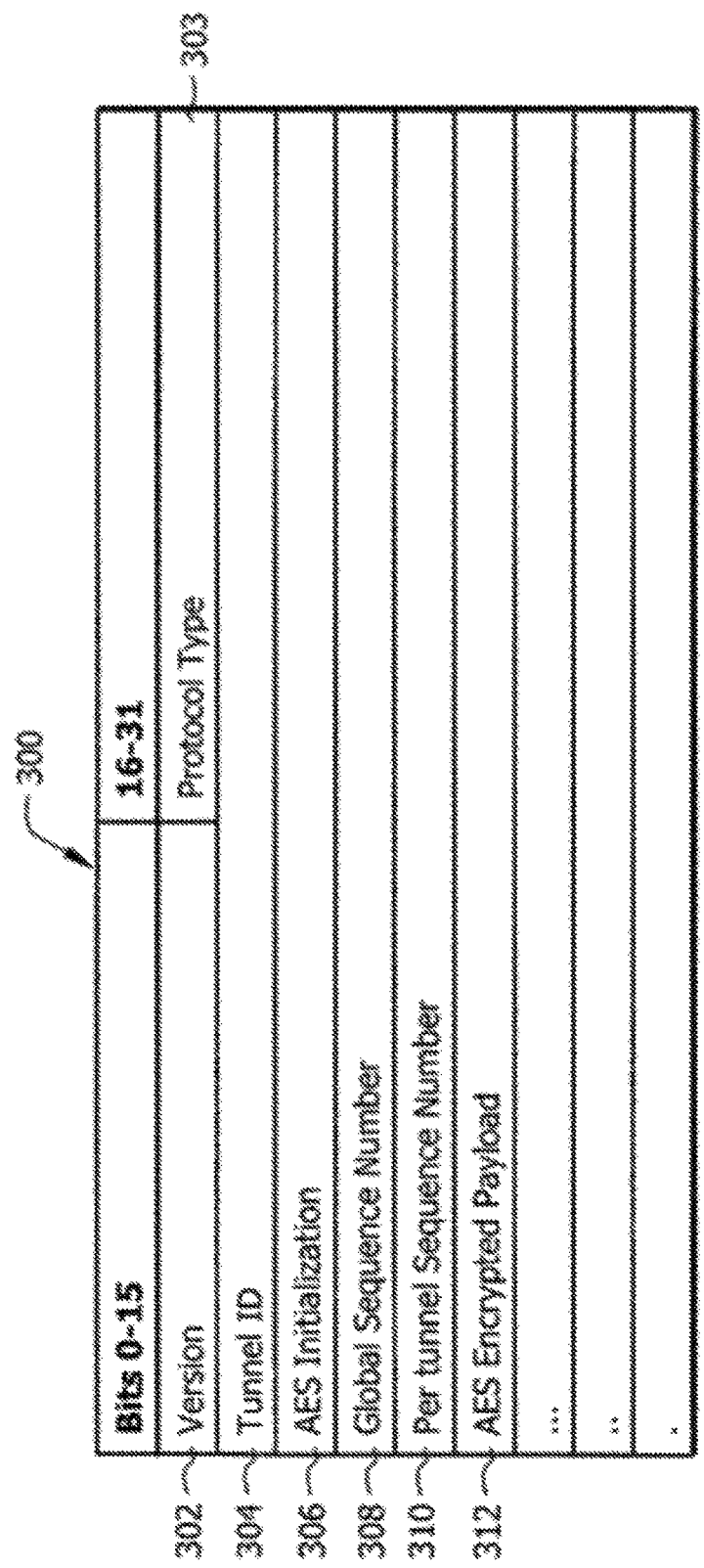
FIG. 3 is an example embodiment illustrating the type of information which may be encapsulated in a transmitted IP packet in accordance with an embodiment of the present invention.

To monitor the bandwidth of the various tunnels 116, some embodiments of the present invention encapsulate each transmitted IP packet with various information. FIG. 3 illustrates an example embodiment showing the type of information 300 which may be encapsulated in a transmitted IP packet. Version field 302 may contain information about the protocol version being utilized and protocol type field 303 may contain the protocol type of the payload packet. In general, the value of this field will correspond to the Ethernet protocol type for the packet. However, additional values may be defined in other documents. Tunnel ID field 304 may be a 32-bit field and may contain an identifier to identify the current tunnel of the IP packet. Advanced Encryption Standard (AES) initialization sector field 306 may be a 32-bit field and may contain an initialization vector for AES encryption. Global sequence number field 308 may be a 32-bit field and may contain a sequence number which is utilized to re-sequence each of the packets for various sessions into the proper order when they have emerged from their respective tunnels. Per tunnel sequence number field 310 may be a 32-bit field which may represent a sequence number that is assigned to each packet routed to a particular tunnel. AES encrypted payload field 312 may be utilized to convey the payload of the IP packet. AES encryption, may be applied for higher security of the payload in order to prevent attacks from third parties.

The per tunnel sequence number discussed above may be used to monitor dropped packets in a tunnel. In one embodiment the router on the receiving end calculates the packet drop rate of each tunnel, DR(x,y), every f seconds by monitoring the per tunnel sequence number of the received packets. DR(x,y) may be characterized as the sequence numbers missed divided by a sequence number increase for a period f. The length of period f may vary, and in one embodiment f is equal to 5 seconds.

Other methods may also be used to monitor dropped packets, e.g.: the sender may periodically inform the receive end how many packets it has sent, the sender sends a heartbeat packet to the receive end every constant period of time and the receive end can estimate the overall drop rate by monitoring the heartbeat packets' drop rate, by acquiring drop rate figures from physical interface/device/layer, etc.

The receive end may feedback a particular tunnel's drop rate, effective weight, or other bandwidth indicators, to the sending router. When the sender receives information regarding packet drops, some embodiments lower the effective weight EW(x,y) of a tunnel by EW(x,y)·DR(x,y). Other metrics may be used to modify the effective weight of a tunnel. In some embodiments, the sender may receive feedback and the effective weight may be reduced by number that is greater than or less than the packet drop rate. Such variances may be configured according to the particular needs of a communication system. The above example represents a metric that attempts to lower the effective weight of the tunnel to a weight which prevents further packet drops while maximizing the amount of usable bandwidth of the tunnel. Any metric which finds this balance may be preferred.

Figure 4A:
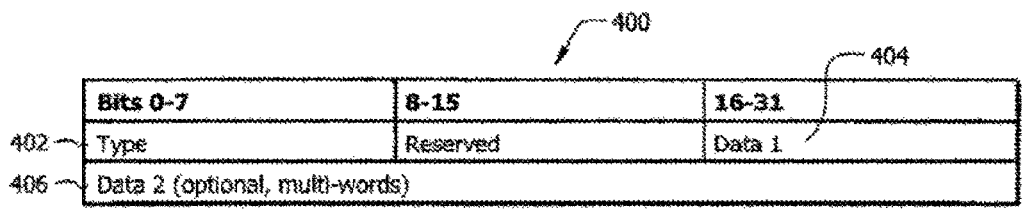
FIG. 4A is an example embodiment illustrating the type of information which may be encapsulated in a feedback packet in accordance with an embodiment of the present invention.

FIG. 4A illustrates an example embodiment of the type of information 400 which may be encapsulated in a feedback packet which is sent to the transmitting router in order to report packet drop rates or other bandwidth related data received at the receiving end router. Type field 402 may include data regarding the type of data that will be included in data 1 field 404 and data 2 field 406. Data 1 field 404 and data 2 field 406 may contain any information which may be used to assist the router in determining tunnel information with regard to the number of tunnels, bandwidth of tunnels, number of dropped packets in a tunnel, and the like. An example of possible values of the type field 402 in the data fields 404 and 406 is shown in the chart of FIG. 4B.

The information which is encapsulated in transmitted IP packets, such as shown in FIG. 3 and FIG. 4 may also be used for packet buffering and re-sequencing. Because each tunnel's latency can be different, when two consecutive packets of the same TCP session are sent to a VPN peer over a bonded VPN tunnel, they may not arrive in sequence because they are routed via two different tunnels. If the TCP session receives the out-of-sequence packets from the VPN, the TCP session will slow down due to TCP retransmissions. Accordingly, the receive end should buffer the packets that come too early until either the slower packets arrive or until an expiration time has passed. With such buffering, late packets that come prior to an expiration time will be forwarded to the destination device in sequence. This buffering assists in the optimization of end-to-end throughput.

It is noted that embodiments described herein are, at times, discussed in the context of a VPN connection. These discussions are presented in order to show an example embodiment of a bonded connection. The inventive concepts described in claimed herein are not limited to such connections. In fact, any connection where sufficient data may be obtained and exchanged in order to dynamically monitor the bandwidth of a plurality of communication paths which are being used in a data transfer session may be implemented with the embodiments of the present invention.

As discussed above, each packet may be assigned two different sequence numbers, a global sequence number (GSN) and a per tunnel sequence number (PTSN). These numbers may be used to assist in packet buffering and re-sequencing operations. After a packet is passed to an upper layer, the receive end may update a next expected per-tunnel sequence number (NE-PTSN) and a next expected global sequence number (NE-GSN).

The following will describe one method of how a packet may be buffered or forwarded to destination device after it is received and decrypted.

1. If the packet's GSN equals to zero, forward it to destination device immediately.
2. Check if the packet's PTSN equals to the NE-PTSN. If not, dequeue (forward to destination device) in sequence all packets that have a smaller GSN than the packet's. Keep the packet unprocessed.
3. Update the NE-PTSN (i.e., set NE-PTSN to PTSN+1).
4. If the GSN is less than the NE-GSN, forward to destination device.
5. If the packet's GSN is equal to the NE-GSN, update the NE-GSN (i.e., set NEGSN to GSN+1) and forward to destination device. Repeat updating the NE-GSN and dequeuing the buffer head from the butler if the head's GSN equals to the new NE-GSN.
6. Otherwise (GSN is larger than the NE-GSN), enqueue the packet in the order of the GSN.
7. If a packet has been in the queue longer than a fixed amount of time, set the NEGSN to the packet's GSN+1 and dequeue in sequence the packet and all packets that have a smaller GSN than the packet's.

Therefore, the encapsulated packet information discussed in FIG. 2 and FIG. 3 may include information that optimizes overall throughput of the data transmission system, such as 100, both by assisting in the optimization of tunnel bandwidth in response to monitoring packet drop rates, and by assisting in the efficient re-sequencing of received packets in a data transfer session.

Figure 5:
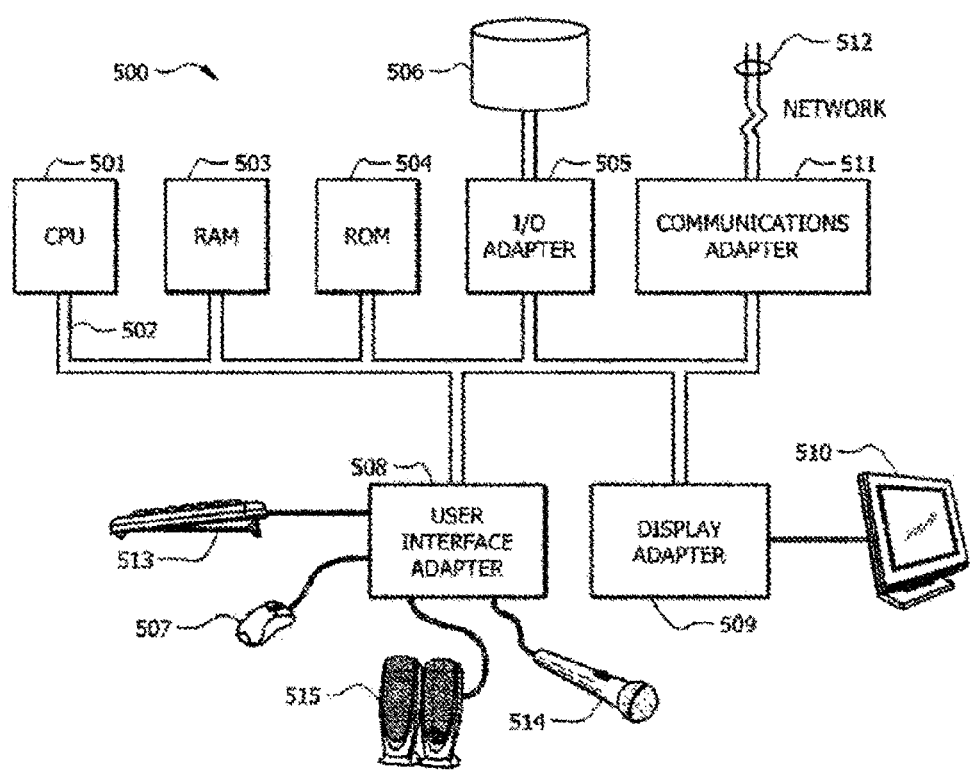
FIG. 5 depicts a block diagram of a processing system which is adapted to implement the present invention.

FIG. 5 illustrates an exemplary processor-based system 500 which may be employed to implement the systems, devices, and methods according to certain embodiments. Processor-based system 500 may represent the architecture of communications router 106 and 108. Central processing unit (CPU) 501 is coupled to system bus 502. CPU 501 may be any general purpose CPU, or may be a special purpose CPU designed to implement the above teachings. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 2. When executing instructions representative of the operational steps illustrated in FIG. 2, CPU 501 becomes a special-purpose processor of a special purpose computing platform configured specifically to operate according to the various embodiments of the teachings described herein.

System 500 also includes random access memory (RAM) 503, which may be SRAM, DRAM, SDRAM, or the like. RAM 503 may be a secondary storage which stores program instructions executable by CPU 501. System 500 includes read-only memory (ROM) 504 which may be PROM, EPROM, EEPROM, or the like. RAM 503 and ROM 504 hold user and system data and programs, as are well known in the art.

System 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with system 500 in, order to input information.

I/O adapter 505 connects storage device(s) 506, such as one or more of hard drive, compact disc (CD) drive, floppy disk drive, tape drive, etc., to system 500. The storage devices are utilized in addition to RAM 503 for the memory requirements associated performing the operations discussed in the above embodiments. Communications adapter 511 is adapted to couple system 500 to network 512, which may enable information to be input to and/or output from system 500 via such network 512 (e.g., the Internet or other wide-area network, a local-area network, a public or private switched telephony network, a wireless network, any combination of the foregoing). Communications adapter 511 may be regarded as a network interface, and system 500 may comprise a plurality of communications adapters 511. User interface adapter 508 couples user input devices, such as keyboard 513, pointing device 507, and microphone 514 and/or output devices, such as speakers) 515 to system 500. Display adapter 509 is driven by CPU 501 to control the display on display device 510. Display adapter 509 transmits instructions for transforming or manipulating the state of the various numbers of pixels used by display device 510 to visually present the desired information to a user. Such instructions include instructions for changing state from on to off setting a particular color, intensity, duration, or the like. Each such instruction makes up the rendering instructions that control how and what is displayed on display device 510.

Figure 6:
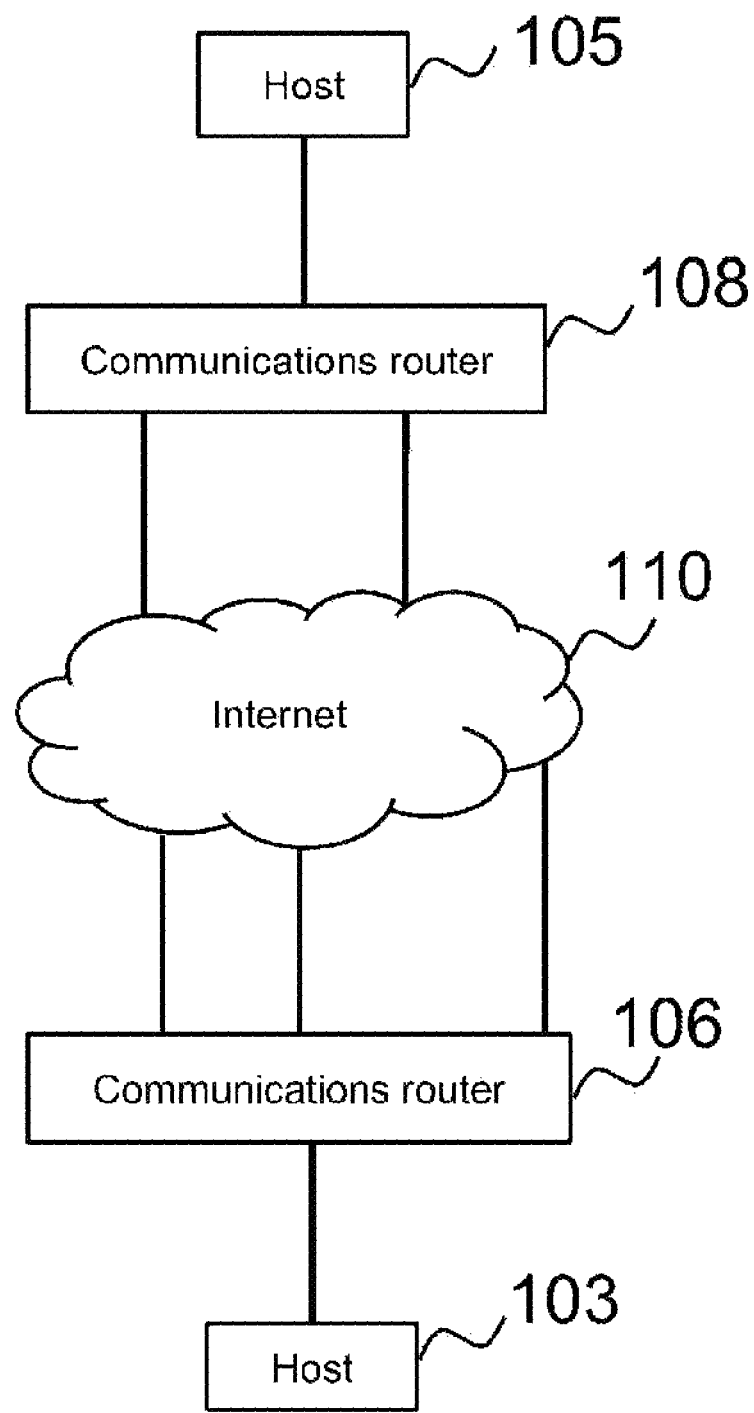
FIG. 6 illustrates a network environment according to various embodiments of the present invention.

FIG. 6 illustrates a network environment based on the network environment illustrated in FIG. 1A. One of the LAN interface of communications router 106 is connected to host 103 and one of the LAN interface of communications router 108 is connected to host 105. Hosts 103 and 105 are in sites 102 and 104 respectively. A plurality of tunnels may be established between communications routers 106 and 108 through network 110. Communications router 106 may establish tunnels with communications router 108 through one or more WAN interfaces of communications router 106 and one or more WAN interfaces of communications router 108. For illustration purpose only, communications router 108 connects to the Internet 110 through two connections while communications router 106 connects to the network 110 through two connections. Network 110 may be an interconnected network, such as the internet.

Figure 7:
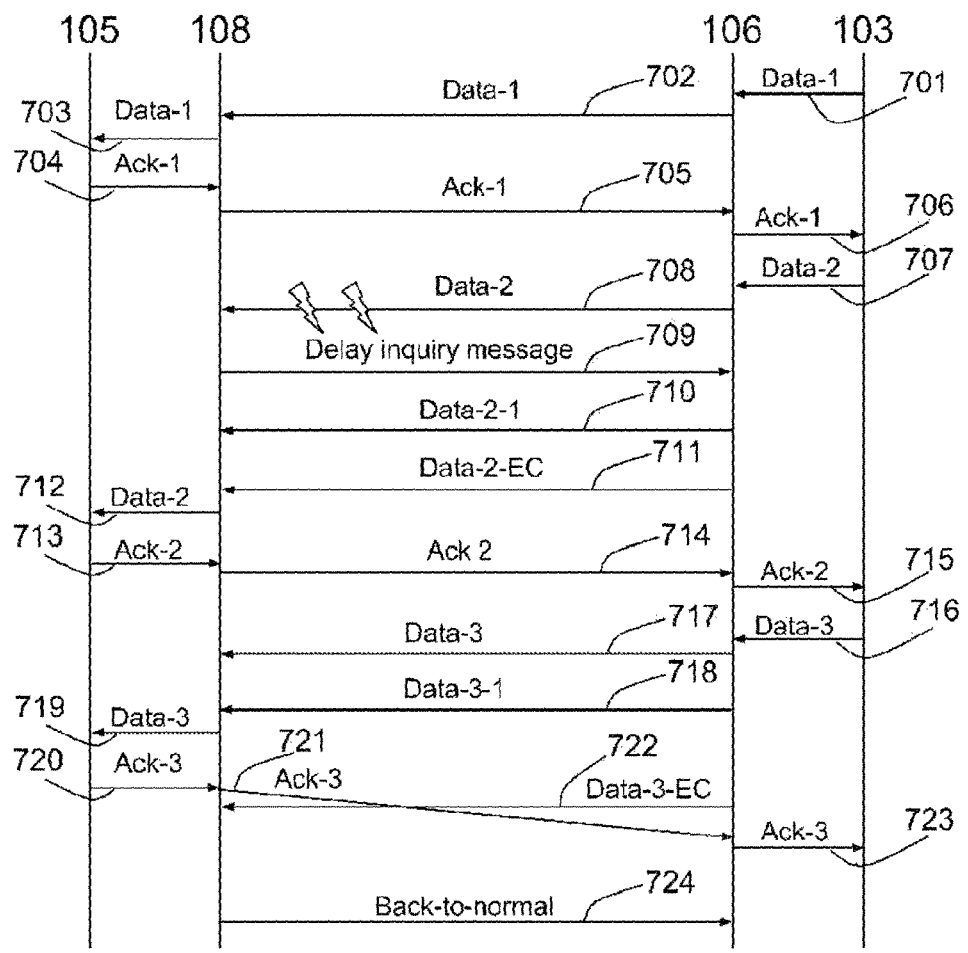
FIG. 7 is a sequence diagram illustrating how data is transferred between hosts according to one of the embodiments of the present invention.

FIG. 7 is a sequence diagram illustrating how data is transferred between host 105 and host 103 according, to one of the embodiments of the present invention. In flow 701, data-1 is transmitted from host 103 to communications router 106. Data-1 is originated at host 103, and is intended to be transmitted to host 105. Data-1 can be comprised in one or more data packets, one or more frames, or any other data unit. Whether data-1 is comprised in one data packet or more data packets depends on the size of data-1. If size of data-1 is such that data-1 can be encapsulated in one data packet, then data-1 is comprised in one data packet. If size of data-1 is too big to be encapsulated in one data packet, data-1 may be fragmented into a plurality of parts and the plurality of parts are encapsulated in a plurality of data packets respectively. Communications router 106 then sends data-1 to communications router 108 in flow 702 through interconnected networks 110. Communications router 108 forwards data-1 to host 105. When host 105 receives data-1, it creates an acknowledgement packet, Ack-1, which is destined to host 103. Ack-1 is received at communications router 108 at flow 704, and forwarded to communications router 106 at flow 705. Communications router 106 then sends Ack-1 to host 103 in flow 706. Therefore host 103 now knows that data-1 reached host 105 successfully. Host 103 then transmits data-2 to host 105 through communications routers 106 and 108. Data-2 is transmitted from host 103 to communications router 106 in 707. Communications router 106 forwards data-2 to communications router 108 in flow 708. Communications router 108 does not receive data-2 on time, as data-2 may be dropped or may be delayed when being transmitted to communications router 108. Communications router 108 then creates and sends a delay inquiry message in flow 709 to inform communications router 106 that data-2 has not been received yet and to check why there is a delay. When communications router 106 receives the delay inquiry message, it determines that data-2 had been lost, and therefore it activates an error correction mode. Under the error correction mode, communications router 106 sends data-2-1 and data-2-EC in flows 710 and 711 respectively. Data-2-1 may be the same as data-2, whereas data-2-EC comprises error correction data corresponding to data-2. Using data-2-1 and/or data-2-EC, communications router 108 can create data-2 and send data-2 to host 105 in flow 712. When host 105 receives data-2, it creates an acknowledgement packet, Ack-2, which is destined to host 103. Ack-2 is received at communications router 108 at flow 713 and forwarded to communications router 106 at flow 714. Communications router 106 then sends Ack-2 to host 103 in flow 715. Host 103 sends data-3 to host 105 through communications routers 106 and 108. Data-3 is transmitted to communications router 106 in flow 716. Since the error correction mode is activated in communications muter 106, communications router 106 sends both data-3 and data-3-1, and also and data-3-EC to communications router 108 in flows 717, 718 and 722 respectively. Communications router 108 successfully receives data-3-1 and forwards data-3 to host 105 in flow 719. Host 105 then creates and sends an acknowledgement packet, Ack-3, which is destined to host 103. Ack-3 is received at communications router 108 at flow 720, and forwarded to communications router 106 at flow 721. Communications router 106 then sends Ack-3 to host 103 in flow 723. As communications router 108 receives both data-3-1 and data-3-EC, it determines that data is no longer being lost, and therefore sends a back-to-normal message to communications router 106 in flow 724. When communications muter 106 receives the back-to-normal message, it can deactivate the error correction mode. When the error correction mode is deactivated, communications router 106 no longer sends error correction packets such as data-2-EC and data-3-EC.

In some communication protocols, such as TCP, when a data transfer session ends, an end message may be sent from the sender to the receiver in order to indicate that the data transfer session has ended, i.e., no more data packets belonging to the data transfer session will be sent. Communications router 108 may determine that data, such as data-2, is delayed or lost, as it may not have received any end message after receiving data-1. Therefore, it sends the delay inquiry message in flow 709 in order to request communications router 106 to resend data-2.

When data is received at communications router 106 from host 103, communications router 106 may save the data in a local storage medium, such as a cache, such that it may send copies of the data when necessary without requiring host 103 to resend the data. In case the data is lost when being transmitted to communications router 108, communications router 106 can quickly resend the data. There is no need to wait for host 103 to resend the data or inform host 103 about the lost. Those who are skilled in the art would appreciate that in some communication protocols, when host 103 is aware the host that data is lost, host 103 may slow down the data transmission. Since the waiting time is reduced, communications router 108 is able to receive a retransmission of the data from communication router 106, instead of making a retransmission request to host 103.

In flow 721, communications router 106 sends out data-3-EC. For illustration purpose, coincidentally data-3-EC is sent before Ack-3 is received at communications router 106. In one variant, if Ack-3 had been received earlier at communications router 106, communications router 106 would not have transmitted data-3-EC.

Contents of data-2-1 may be the same as contents of data-2, as communications router 106 resends data-2 by sending data-2-1. Data-2-EC is encapsulated in error correction packets. In one variant, the data packet encapsulating data-2-1 is identical to the data packet encapsulating data-2 as the content of data-2-1 is the same as the content of data-2, source addresses of the data packets are the same and destination addresses of the data packets are the same.

Error correction packets may be packets that are transmitted by communications router 106 to correct or detect any errors in data packets that are transmitted from communications router 106 to communications router 108. Error correction packets include Forward error correction (FEC) packets or Automatic repeat request (ARQ) packets, Parity packets, or the like. In one variant, error correction packets may also be combinations of two or more packets. For example, if a first packet comprises data-2 and a second packet comprises data-2-EC, a third packet may comprise data content based on an exclusive OR (XOR) operation applied to the contents of first and second packets. Using data-2-EC, communications router 108 may be able to retrieve data-2, and sends data-2 to host 105.

In one variant, data-2 may be fragmented into two parts. A first part of data-2 is encapsulated in a first data packet and a second part of data-2 is encapsulated in a second data packet. For illustration purpose, when communications router 106 sends data-2 to communications router 108 in flow 708, communications router 108 receives the first data packet, but the second data packet is dropped or lost. Communications router 108 then sends the delay inquiry message in flow 709. Data-2-EC may comprise an error correction packet whose data content is based on an XOR operation applied to the contents of the first data packet and the second data packet, i.e., the XOR operation is applied to the first part of data-2 and the second part of data-2. When communications router 106 sends data-2-EC, communications router 108 can retrieve the second part of data-2 by using the first part of data-2 and data-2-EC. It would be known to those skilled in the art how the second part of data-2 can be retrieved using the first part of data-2 and data-2-EC, as data-2-EC is based on the first and second part of data-2.

In one variant, when communications router 106 receives the delay inquiry message and error correction mode is activated, communications router 106 may only send error correction packets, such as data-2-EC, and does not send data-2-1. In another variant, when communications router 106 receives the delay inquiry message, communications router 106 may only send data-2-1 and not send data-2-EC. The benefit of sending either only one of data-2-1 and data-2-EC is that fewer number of packets are transmitted, and hence lower bandwidth is consumed. This may help reduce traffic congestion. However, in some scenarios, data-2-EC alone may not help in retrieving data-2 if data-2-1 is not received. For example, when data-2-EC only contains a checksum or parity packets, it can only be used for error detection. In another example, when data-2-EC is created by applying XOR operation on two packets of data-2, data-2 can only be retrieved from data-2-EC if at least one of the two packets of data-2 had been received. Thus, sending data-2-1 may be helpful, such that data-2 may be retrieved using data-2-1 and data-2-EC. In one variant, as there may be some errors in data-2-1 received at communications router 108, data-2-EC may be used to correct the errors.

Figure 11:
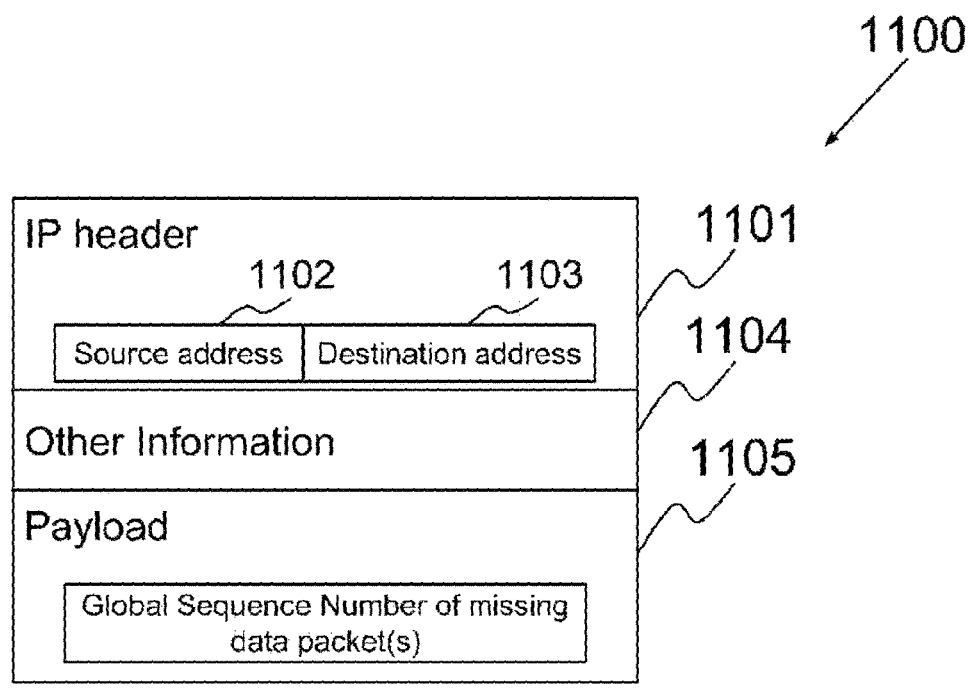
FIG. 11 illustrates the structure of a delay inquiry message according to one of the embodiments of the present invention.

FIG. 11 illustrates the structure of a delay inquiry message according to one of the embodiments of the present invention. Delay inquiry message 1100 may be sent when any data packet is dropped or lost, i.e., there is a missing data packet. Delay inquiry message 1100 may be an IP packet comprising IP header 1101, other information field 1104 and payload 1105. IP header 1101 comprises a source address field 1102 and destination address field 1101. For example, referring to FIG. 7, the delay inquiry message sent in flow 709 is the source address is IP address of communications router 108 and the destination address is the IP address of communications router 106. Other information field 1104 may include various information such as the nature of the IP packet, i.e. information that the TP packet is a delay inquiry message. This indicates to communications router 106 that the IP packet is not a data packet, and just a management message. Communications router 106 may process data packets and management messages differently. For example, communications router 106 may store data packets received from communications router 108 in a cache, but communications router 106 may not store management messages such as the delay inquiry message in the cache. Other information field 1102 may further include session information in order to indicate which session the missing packet belongs to. Payload 1105 may contain GSN of the missing packet. For example, in flow 709, payload 1105 of delay inquiry message 1100 sent by communications router 108 to communications router 106 may contain GSN of one or more data packets corresponding to data-2 as data-2 had not reached communications router 108 successfully. When communications router 106 receives delay inquiry message 1100 from communications router 108, and payload 1105 contains GSN of one or more data packets corresponding to data-2, communications router 106 may determine that communications router 108 has not received data-2. Therefore communications router 106 then sends data-2-1 and data-2-EC to communications router 108. The scope of the invention is not limited to the delay inquiry message being an IP packet. The delay inquiry message may be a short messaging service (SMS) message, a multimedia messaging service (MMS) message, or any other type of message that can be sent by communications router 108 to communications router 106 for giving information of any missing data packets.

Figure 8:
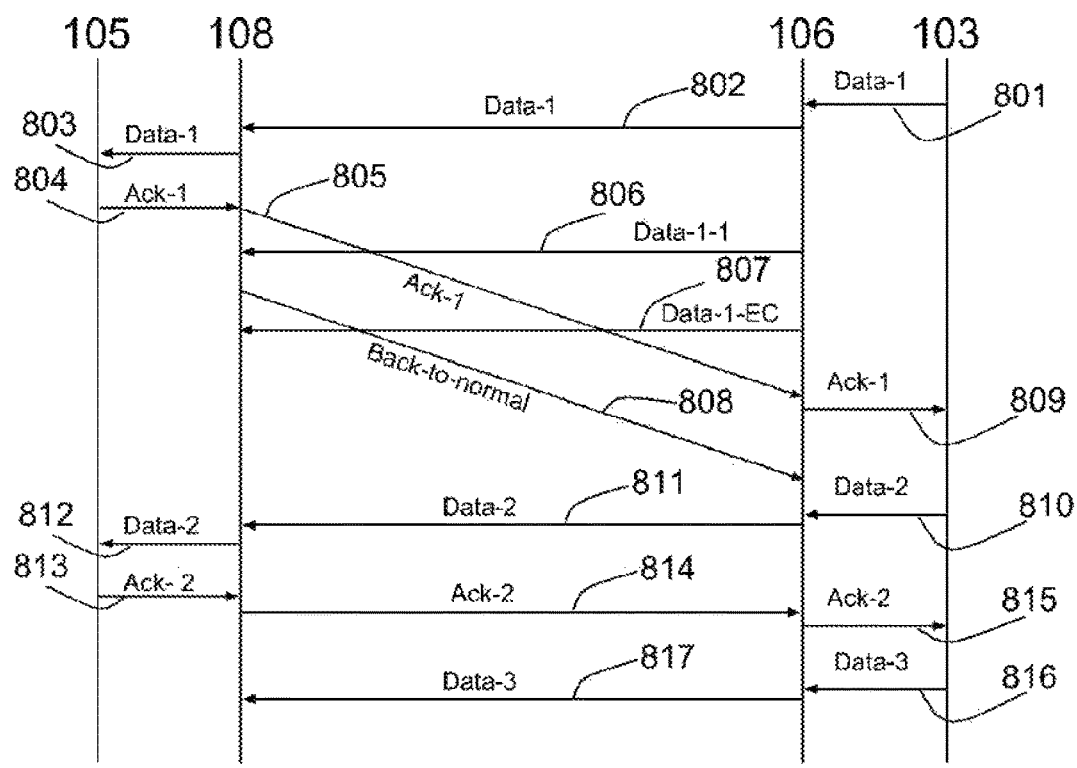
FIG. 8 is a sequence diagram illustrating how data is transferred between hosts according to one of the embodiments of the present invention.

FIG. 8 is a sequence diagram illustrating how data is transferred between host 105 and host 103 according to one of the embodiments of the present invention. Host 103 sends data-1 to host 105 through communications routers 106 and 108. Data-1 is transmitted from host 103 to communications router 106 in flow 801. Communications router 106 then transmits data-1 to communications router 108 in flow 802 and communications router 108 forwards data-1 to host 105 in flow 803. Communications router 106 is initially in error correction mode, and hence, after a waiting time period, it sends data-1-1 and data-1-EC in flows 806 and 807 respectively. The benefit of transmitting data-1-1 and data-1-EC is that in case data-1 was lost, host 103 would not have to retransmit data-1. Data-1-1 and data-1-EC may help communications router 108 to create and send data-1 to host 105 in case data-1 was lost in flow 802. When host 105 receives data-1, it creates an acknowledgement packet, Ack-1, which is destined to host 103. Ack-1 is transmitted to communications router 108 in flow 804 and is transmitted by communications router 108 to communications router 106 in flow 805. As communications router 108 receives both data-1 and data-1-1 from communications router 106, it sends a back-to-normal message to communications router 106 in flow 808. After receiving the back-to-normal message to communications router 106 deactivates the error correction mode as packets are no longer being lost. Host 103 transmits data-2 which is destined to host 105. When data-2 is received at communications router 106 in flow 810, communications router 106 forwards data-2 to communications router 108 in flow 811. Communications router 108 then forwards data-2 to host 105 in flow 812. As the error correction mode has been deactivated, communications router 106 does not send any error correction packets for data-2. When host 105 receives data-2, it creates an acknowledgement packet, Ack-2, which is destined to host 103. Ack-2 is sent to communications router 108 in flow 813, and is forwarded to communications router 106 in flow 814. Communications muter 106 then sends Ack-2 to host 103 in flow 815.

The waiting time period between communications router 106 sending data-1 and sending data-1-1 may be adjusted or adapted to different networking need. The purpose of transmitting data-1-1 is to reduce the probability of host 103 retransmitting data-1. Host 103 may retransmit data-1 for one or both of the following reasons: (i) when host 103 determines that data-1 is lost because an acknowledgement has not been received, and (ii) when host 105 sends a request to host 103 to resend data-1. Therefore, in one variant, the waiting time period is preferably smaller than both (i) a first time period between host 103 sending data-1 and host 103 deciding to retransmit data-1, and (ii) a second time period between host 103 transmitting data-1 and host 105 deciding to send a request to host 103 to resend data-1. The first time period and the second time period may be defined in the transmission protocol, such as TCP protocol. As a certain delay is caused for data to travel from communications router 106 to communications router 108, a third time period required for a data packet to be transmitted from communications router 106 to communications router 108 may also be taken into consideration for setting the waiting time period. The third time period may vary according to network conditions. The waiting time period may then be smaller than the first time period minus the third time period, and may also be smaller than the second time period minus the third time period. The benefit of reducing the probability of host 103 retransmitting data-1 is that host 103 does not slow down the data transmission because of the packet drop. In another variant the waiting time period is larger than a fourth time period, which is the time required, in general, for Ack-1 to be transmitted from communications router 108 to communications router 106. This may cause communications router 108 to wait for receiving Ack-1 for the time required, and if Ack-1 is not received within the fourth time period, data-1-1 and data-1-EC are transmitted. The benefit of the waiting time period being larger than the fourth time period is that less bandwidth may be consumed, as data-1-1 and data-1-EC is not transmitted if Ack-1 is received. However, the fourth time period may vary according to network conditions. The disadvantage of the waiting time period being larger than the fourth time period is that when the fourth time period has passed, host 103 may retransmit data-1, and may also slow down the data transmission. Therefore it is preferred to take into consideration the first, second, and third time periods as discussed above, and ignore the fourth time period. This ensures that data is transmitted successfully and data transmission is not slowed down, even though bandwidth consumption may be higher. In another variant, the waiting time period is adjustable by the administrator of communication routers 106 and 108.

The difference between the sequence diagrams in FIG. 7 and FIG. 8 is that in FIG. 7, the error correction mode is activated at communications router 106 when a delay inquiry message is received at communications router 106. Alternatively, in FIG. 8, the error correction mode may be activated by default, or may be activated by a user or administrator of communications router 106. If the error correction mode is activated by default, there may be traffic congestion caused by error correction packets and resending of data packets. This may slow down the data transmission and consume significantly high bandwidth. Therefore, it may be beneficial to activate the error correction mode only when a delay inquiry message is received in order to save bandwidth and reduce traffic congestion. However, having the error correction mode activated by default may make the process of resending data packets and error correction packets faster, as communications router 106 does not need to wait for communications router 108 to send the delay inquiry message. This can be beneficial when communications router 106 already knows that the packet drop rate or the packet loss rate of a tunnel is high. When packet drop rate or packet loss rate is high, communications router 106 resends data packets and sends error correction packets.

In an example, when host 103 is transmitting data to host 105 through communications router 106 and 108 using TCP, and many packets are being dropped or lost, host 103 may reduce transmission rate in order to reduce packet loss and packet drop. This may make the overall transmission much slower, even if the increase in packet drop is temporary. Additionally, when host 103 determines that a packet has been dropped or lost, it will resend the packet. The overall transmission may be faster when communications router 106 resends packets, compared to when host 103 resends packets. In order to avoid host 103 reducing transmission rate and resending packets, communications router 106 sends more than one copy of the same packet, for example data-2 and data-2-1, and may also send error correction packets, for example data-2-EC. When communications router 106 sends more than one copy of the same packet, redundancy is higher and it is more likely that the packet will be received at host 105. Therefore, acknowledgement packets may be sent from host 105 and received at host 103 on time, and host 103 would not need to reduce the transmission rate or resend packets.

In a preferred embodiment, copies of the same packet are transmitted through different tunnels of an aggregated connection, if possible. For example, referring to FIG. 7, if data-2 is transmitted in flow 708 through tunnel 103A, data-2-1 is transmitted in flow 710 through tunnel 103B and data-2-EC is transmitted in flow 711 through tunnel 103C. This may allow data-2, data-2-1 and data-2-EC to be transmitted substantially at the same time. Furthermore, if tunnels 103A, 103B and 103C are established using networks provided by different service providers, the chance of at least one of data-2, data-2-1 and data-2-EC reaching communications router 108 successfully is higher. This is because the network quality of the tunnels may differ. If the network quality of tunnel 103A is not satisfactory or tunnel 103A is broken or tunnel 103A is experiencing lots of packets drop, data-2 may not reach communications router 108 successfully. If data-2 is sent through tunnel 103A, data-2-1 may experience the same network problem as data-2 has just experienced. Therefore, it is preferred to send data-2-1 through a different tunnel, such as tunnel 103B, which may experience better network performance as the path, route or connection used by tunnel 103B may be different from the path, route or connection used by tunnel 103A. The use of different tunnels is more like to increase the probability of data-2-1 to reach communications router 108 successfully.

Figure 9:
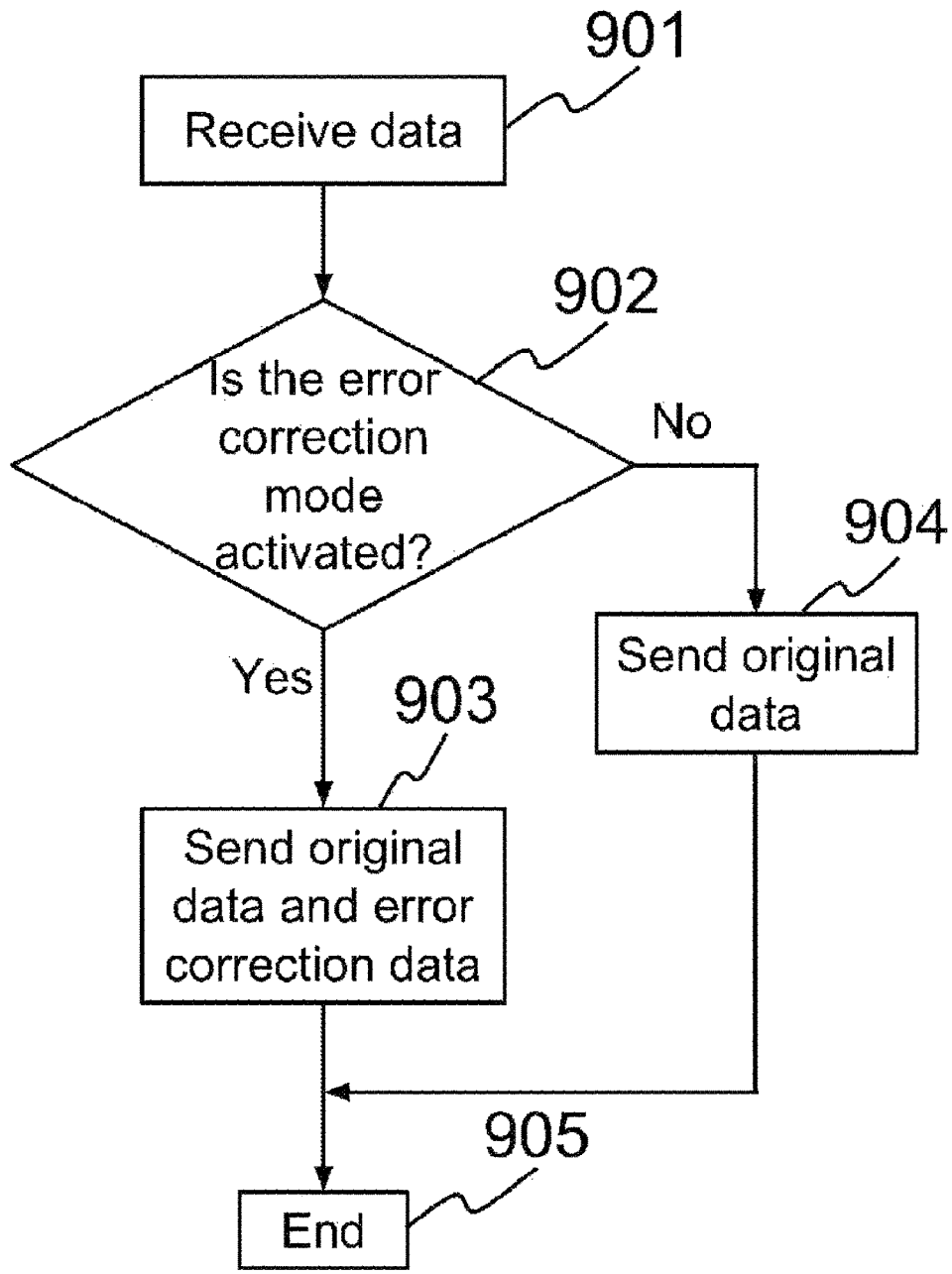
FIG. 9 is a flowchart illustrating a process carried out at a first communications router according to one of the embodiments of the present invention.

FIG. 9 is a flowchart illustrating a process carried out at communications router 106 according to one of the embodiments of the present invention. Communications router 106 receives data from host 103 in step 901, where the data is destined to host 105. Communications router 106 determines, in step 902, whether the error correction mode is activated. If the error correction mode is activated, communications router 106 sends both the original data and error correction data for the original data in step 903. The original data is same as data received originally from host 103. Alternatively, if the error correction mode is not activated, communications router only sends the original data in step 904. The process ends in step 905.

Figure 10:
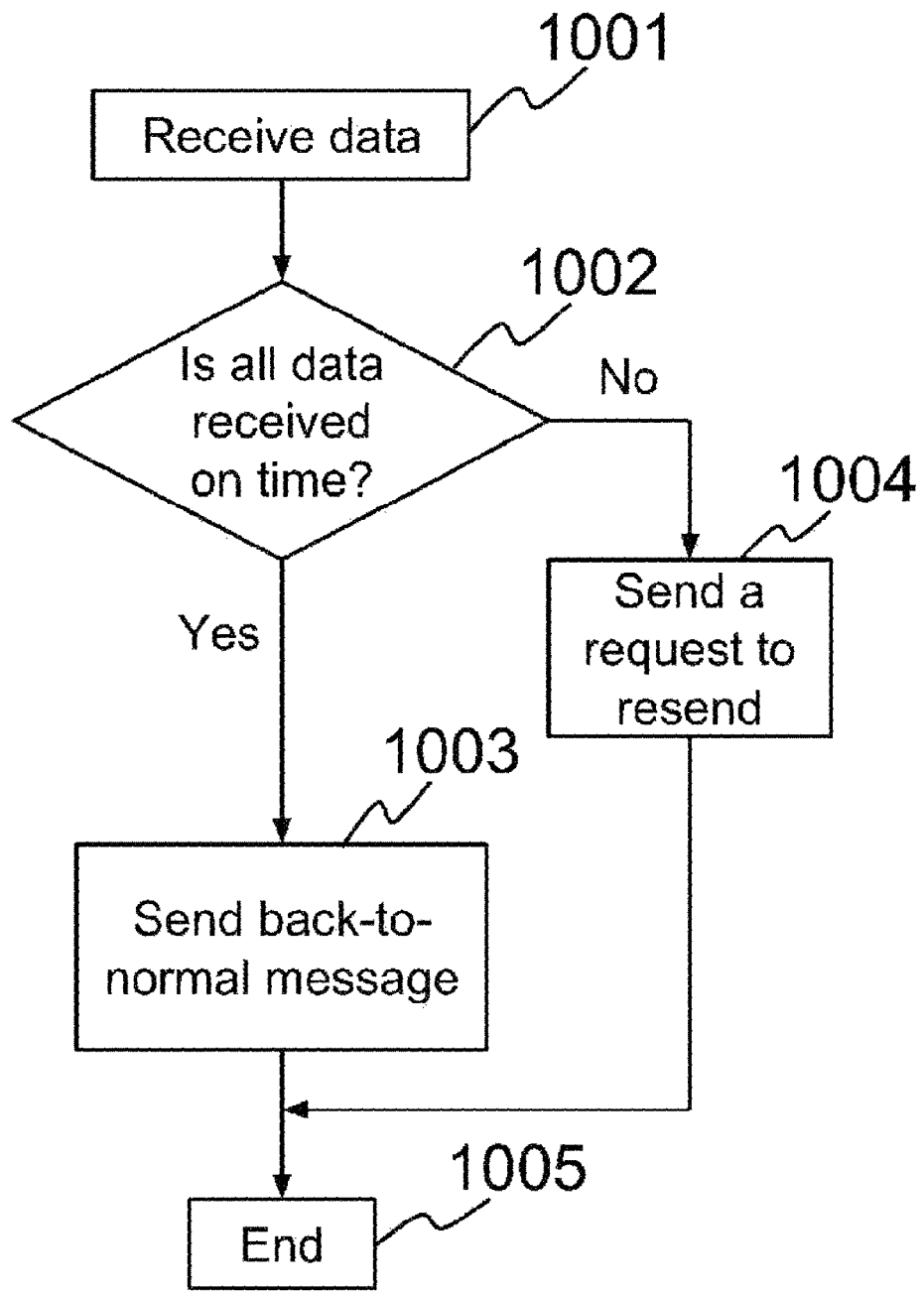
FIG. 10 is a flowchart illustrating a process carried out at a second communications router according to one of the embodiments of the present invention.

FIG. 10 is a flowchart illustrating a process carried out at communications router 108 according to one of the embodiments of the present invention. Communications router 108 receives data from communications router 106 in step 1001. Communications router 108 then determines in step 1002 whether all data is received on time. When error correction mode is activated in communications router 106, all data comprises original data sent by host 103, and error correction data originated at communications router 106. If all data, is received on time, communications router 108 sends a back-to-normal message to communications router 106 in step 1003. Communications router 108 may forward the original data to host 105. Alternatively, if all data is not received on time, communications router 108 sends a request to communications router 106 in step 1001, where the request is to resend the data. The process ends in step 1005.

In one variant, if the error correction mode is already deactivated, 1003 is omitted. Communications router 108 determines whether the error correction mode is activated or not.

It is preferred that communications router 108 sends the request to reseed data in step 1001 before host 103 determines that the data has not been transmitted successfully. When communications router 100 receives the request to resend data, it resends a copy of the data to communications router 108. Communications router 106 may also send error correction data to communications router 108.

Communications routers 106 and 108 preferably have a large cache memory. According to the present invention, communications router 106 has to create and send error correction packets and copies of packets based on packets sent by host 103 and saved in the cache memory of communications router 106. Therefore communications router 106 may need to save many packets in its cache memory. Additionally, a plurality of management messages, such as back-to-normal message and delay inquiry message may need to be exchanged between communications routers 106 and 108. These management messages may also need to be saved in the cache memory of communications router 106 and 108.

It should be appreciated that communications router 108 is capable of performing the same processes as communications router 106 and vice versa. In the above description, communications router 106 has been described as the data sender and communications router 108 has been described as the data receiver for readability. It should be noted that the scope of the invention is not limited to only host 103 sending data to host 105, such that data transmission can also take place from host 105 to host 103. The data transmission can also be bidirectional, such that both host 103 and host 105 may send data to each other.

As communication routers need to store data for resending, storage medium is used for storing the data. The amount of storage required should be able to hold at least a few seconds of data being transmitted. Tt is preferred to store about twenty seconds of data transmission. For example, for an access connection that is capable of sending 100 Mbit per seconds, the amount of storage should be about twenty seconds times 100 Mbit per seconds and-results in about 250 MBytes of storage. Those who are skilled in the art would appreciate that the larger the storage is, the more data can be retransmitted.

The invention claimed is:

1. A method carried out at a first communications router for managing an error correction mode, comprising the steps of:
   (a) transmitting a first data packet to a second communications router;
   (b) storing the first data packet in a local non-transitory storage medium;
   (c) activating the error correction mode when a delay inquiry message is received from the second communications router; wherein the delay inquiry message indicates that the first data packet has not been received by the second communications router successfully;
   (d) retransmitting the first data packet to the second communications router;
   (e) transmitting an error correction packet corresponding to the first data packet; wherein the delay inquiry message comprises a global sequence number of the first data packet;
   (f) deactivating the error correction mode when a back-to-normal message is received from the second communications router; wherein the back-to-normal message indicates that the first communications router no longer needs to be in error correction mode.

2. The method of claim 1, wherein the first data packet is received from a first host through a local area network (LAN) interface, wherein the first data packet is destined to a second host reachable through the second communications router.

3. The method of claim 1, wherein the error correction packet is a combination of a plurality of packets, wherein the plurality of packets include the first data packet.

4. The method of claim 1, wherein the error correction packet is a forward error correction (FEC) packet, automatic repeat request (ARQ) packet, or parity packets.

5. The method of claim 1, wherein when a plurality of data packets have not been received by the second communications router, the delay inquiry message comprises global sequence numbers of the plurality of data packets.

6. The method of claim 1, wherein the delay inquiry message is an internet protocol (IP) packet, wherein the IP packet comprises a header, an other information field, and a payload; wherein the global sequence number of the first data packet is in the payload, wherein the other information field comprises information that the IP packet is a delay inquiry message, and session information of the first data packet.

7. The method of claim 1, wherein steps (d) and (e) are performed after a waiting time period.

8. The method of claim 1, wherein the first data packet is transmitted through an aggregated connection established between the first communications router and the second communications router; wherein the aggregated connection comprises a plurality of end-to-end connections.

9. The method of claim 8, wherein the plurality of end-to-end connections comprises a first, second and third end-to-end connection; wherein the first data packet is transmitted in step (a) through the first end-to-end connection, the first data packet is retransmitted in step (d) through the second end-to-end connection, and the error correction packet is transmitted in step (e) through the third end-to-end connection.

10. The method of claim 1, wherein the local non-transitory storage medium is a cache memory, wherein the cache memory is capable of storing at least twenty seconds of data transmission.

11. A system for managing an error correction mode at a first communications router for managing an error correction mode, wherein the first communications router comprising:
    a plurality of network interfaces;
    at least one processing unit;
    at least one local non-transitory storage medium storing program instructions executable by the at least one processing unit for performing the steps of:
    (a) transmitting a first data packet to a second communications router;
    (b) storing the first data packet in a local non-transitory storage medium;
    (c) activating the error correction mode when a delay inquiry message is received from the second communications router; wherein the delay inquiry message indicates that the first data packet has not been received by the second communications router successfully;
    (d) retransmitting the first data packet to the second communications router;
    (e) transmitting an error correction packet corresponding to the first data packet; wherein the delay inquiry message comprises a global sequence number of the first data packet;
    (f) deactivating the error correction mode when a back-to-normal message is received from the second communications router; wherein the back-to-normal message indicates that the first communications router no longer needs to be in error correction mode.

12. The system of claim 11, wherein the first data packet is received from a first host through a local area network (LAN) interface, wherein the first data packet is destined to a second host reachable through the second communications router.

13. The system of claim 11, wherein the error correction packet is a combination of a plurality of packets, wherein the plurality of packets include the first data packet.

14. The system of claim 11, wherein the error correction packet is a forward error correction (FEC) packet, automatic repeat request (ARQ) packet, or parity packets.

15. The system of claim 11, wherein when a plurality of data packets have not been received by the second communications router, the delay inquiry message comprises global sequence numbers of the plurality of data packets.

16. The system of claim 11, wherein the delay inquiry message is an internet protocol (IP) packet, wherein the IP packet comprises a header, an other information field, and a payload; wherein the global sequence number of the first data packet is in the payload, wherein the other information field comprises information that the IP packet is a delay inquiry message, and session information of the first data packet.

17. The system of claim 11, wherein steps (d) and (e) are performed after a waiting time period.

18. The system of claim 11, wherein the first data packet is transmitted through an aggregated connection established between the first communications router and the second communications router; wherein the aggregated connection comprises a plurality of end-to-end connections.

19. The system of claim 18, wherein the plurality of end-to-end connections comprises a first, second and third end-to-end connection; wherein the first data packet is transmitted in step (a) through the first end-to-end connection, the first data packet is retransmitted in step (d) through the second end-to-end connection, and the error correction packet is transmitted in step (e) through the third end-to-end connection.

20. The system of claim 11, wherein the local non-transitory storage medium is a cache memory, wherein the cache memory is capable of storing at least twenty seconds of data transmission.

* * * * *